Dec. 14, 1965         F. C. BARBER ETAL         3,223,088
                       BONE CUTTING APPARATUS
                       Filed April 8, 1963

INVENTORS
Forest C. Barber
BY James Ronald Smith
Wm. T. Wofford
Attorney

United States Patent Office 3,223,088
Patented Dec. 14, 1965

3,223,088
BONE CUTTING APPARATUS
Forest C. Barber and James Ronald Smith, Fort Worth, Tex., assignors to S. B. Power Surgical Tools Company, Fort Worth, Tex., a corporation of Texas
Filed Apr. 8, 1963, Ser. No. 271,247
6 Claims. (Cl. 128—310)

Our invention relates to surgical bone cutting apparatus, and is especially applicable to apparatus for cutting, with means other than a saw, a section of the skull; such cutting operation being referred to hereinafter as trepanning.

After a physician, usually a neurosurgeon, has determined that a brain operation is necessary to properly treat a brain disorder, he is faced with the problem of trepanning the skull. The most commonly employed procedure for performing trepanning operations heretofore has involved the use of a hand operated surgical saw. After the patient's scalp is laid back, exposing a small area of the skull, the surgeon drills four small holes in the skull at the corners of a rectangle, generally. Then the surgeon threads a fine surgical saw blade through one hole, passing it between the inner surface of the skull and the dura mater, and out of an adjacent hole. After the saw blade is firmly fixed in a saw frame, the surgeon reciprocates the saw until he saws through the skull along the line joining the two holes. This laborious work is repeated again and again until the surgeon can finally lay back the small section of the skull. But, he is then only just ready to commence the main part of the brain operation. Furthermore, by this time, the dura mater has usually been torn from the skull in places, the skull bone tissue is bleeding and may be hemorrhaging, and the whole exposed area of skull is quite bloody. It is then necessary to spend some additional valuable time to stop the bleeding before proceeding further. Such a trepanning operation generally takes from 30 to 45 minutes and the additional time to stop the bleeding may take from 5 to 30 minutes. Trepanning the skull in this manner leaves much to be desired. From time to time various types, constructions and arrangements of surgical trepans and other bone cutting apparatus have been proposed, but none has proved entirely satisfactory in meeting the many practical and exacting requirements for an apparatus of this nature.

Accordingly, it is the general object of the present invention to provide an improved, more effective bone cutting apparatus.

Another object of the present invention is to provide an improved apparatus whereby trepanning the skull may be accomplished in a significantly shorter time than is required using prior art apparatus.

Another object of the invention is to provide a cutter element for bone cutting apparatus that will operate satisfactorily and effectively at high speeds.

Another object of the present invention is to provide a cutter element for a trepanning apparatus that will reduce significantly the tendency of the skull to hemorrhage during trepanning.

Another object of the invention is to provide an improved trepanning and bone cutting apparatus that is light weight and more readily manipulatable and so is less tiring to use.

These and other objects are effected by our invention as will be apparent from the following description taken in accordance with the accompanying drawing, forming a part of this application in which.

Figures 1, 3:
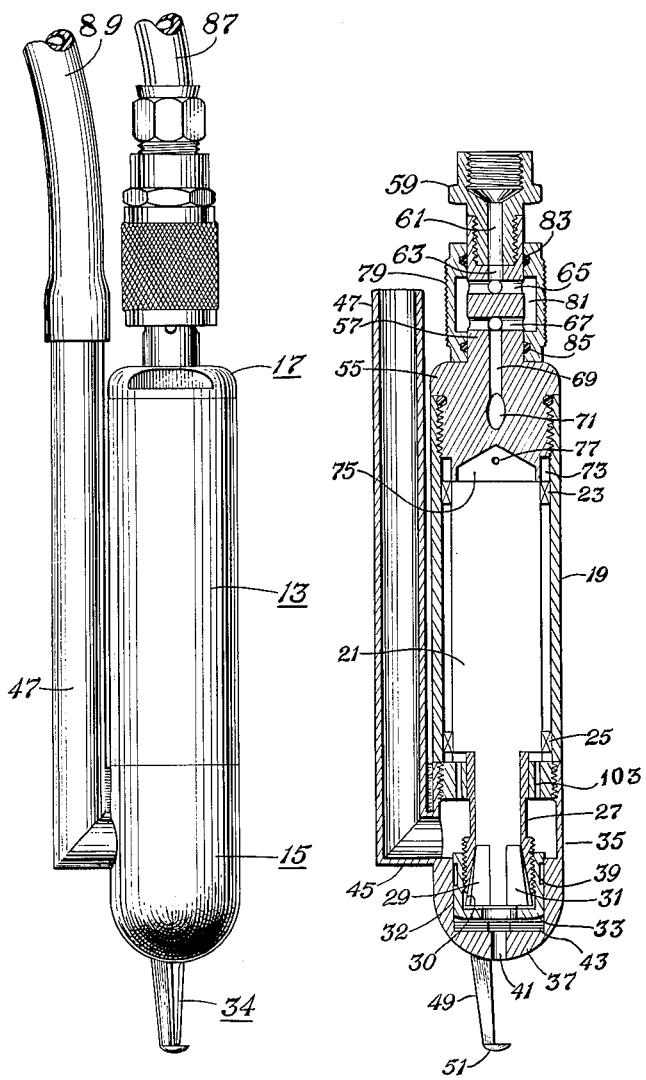
FIG. 1 is a schematic elevational view of a trepanning apparatus in accordance with a preferred embodiment of the invention.
FIG. 3 is a schematic longitudinal sectional view of the apparatus of FIG. 1.
Figure 4:
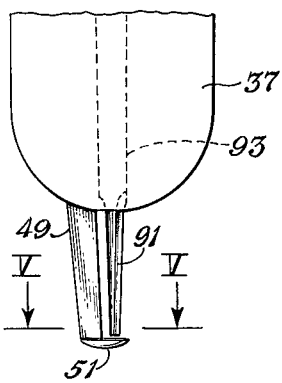
FIG. 4 is a schematic elevational view (at an enlarged scale) of the lower end portion of the apparatus of FIG. 1.

Referring to the drawing, FIG. 1 illustrates a trepanning apparatus 11 which includes a main body portion 13, a lower body portion or adapter cap 15, and an upper body portion 17.

The main body portion 13 comprises a cylindrical tubular shell 19 (see FIG. 3) within which is journaled a fluid drive motor or rotor 21 which is adapted for rotation about the longitudinal axis of the shell 19 by a fluid under pressure, such as an inert compressed gas or compressed air. Both the upper and the lower ends of the fluid motor are supported respectively by suitable bearings 23, 25 which are suitably mounted to the inner wall of the tubular shell 19. The fluid motor 21, as well as the bearings 23, 25, are commercially available. A satisfactory type of fluid motor and bearings may be obtained from Rota Tools, Cleveland, Ohio. If desired, of course, a satisfactory type of nonfluid motor could be used. Extending downward from the fluid motor 21 is a spindle 27, which is an extending portion of the central drive shaft of the fluid motor 21. A chuck or collet device 29, which includes a plurality of conventional tapered jaw blades 31 that are set into and maintained in spaced apart relation by a suitable plastics matrix, is inserted into a prepared cavity 30 in the lower end of the spindle 27. A cap 32, having a central hole 33 therein, threadedly engages the spindle 27, so that, as the cap is screwed onto the spindle, it urges the jaw blades 31 toward the central axis of the tool and into a holding engaging relation with the shank of a cutter element 34, when it is inserted in the chuck or collet 29.

Figure 5:
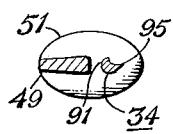
FIG. 5 is a sectional view (at an enlarged scale) taken along line V—V of FIG. 4.

The lower body portion 15, or adapter cap, comprises a cylindrical tubular shell 35, which has substantially the same outside diameter as the main body portion 13, and an integrally attached hemispherical dome portion 37. The open end of the lower body portion threadedly engages the lower end of the main body portion 13; the dome portion 37 being provided with an internal cavity or well 39 which receives the cap 32 and the chuck or collet 29. There is a central axial passage 41 in the dome portion 39 which is aligned with the hole 33 in the cap 32 and also with the axis of the chuck or collet 29. A plurality of wafer-like washers 43 are located within the cavity 39 between the cap 32 and the bottom of the cavity. The washers 43 are made preferably of a plastics material which will support the thrust of the fluid motor 21 and which will not develop unnecessary friction with the rotating cap engaging them. A short exhaust tube 45 pierces the wall of the tubular shell 35 in a generally perpendicular direction and is fixed thereto, as by welding or in any other appropriate manner. The exhaust tube 45 is located just below the lower end of the fluid motor 21 and just above the top of the cavity 39 in the dome portion 37. Another length of exhaust tube 47 is fixed approximately perpendicularly to the free end of the tube 45 and lies in a central longitudinal plane of the apparatus 11. The exhaust tubes 45, 47 may be of any appropriate size and in a preferred embodiment they are each three-eighths of an inch outside diameter. An elongate strut 49, which has a trapezoidal cross sectional form (see FIG. 5) is fixed at one end to the dome portion 37 adjacent the passage 41 and is disposed downward in the central longitudinal plane of the apparatus. The cross section area of the strut 49 decreases uniformly in the direction away from the dome portion 37. A semiellipsoidal type of guide foot 51, which has an oval shape in plan view and a generally semioval cross sectional shape, is fixed to the free lower end of the strut 49 so that the strut is at the end of the major diameter of the foot 51, as shown in FIG. 5. The strut 49 is inclined downward and toward the central longitudinal axis at substantially the same slope as the slope of the back of cutter element 34, to be described hereinafter.

The upper body portion 17 includes a plug 55 which threadedly engages the internally threaded upper end of the tubular shell 19. A cylindrical neck 57 is formed integrally at the top of the plug 55 and is aligned with the central axis of the apparatus 11. The upper end portion of the neck 57 is recessed and threaded to receive an adapter fitting 59 having an axial passage 61 through it that communicates with a short axial passage 63 in the neck 57. The passage 63 communicates, also, with a plurality of radial passages 65 through the neck 57. A plurality of similar radial passages 67 communicate also with another axial passage 69, which extends downward from these passages 67 to a convenient location, within the plug 55, at which place the passage 69 divides into two downwardly sloping branch passages 71. These branch passages 71 pierce the wall of the plug 55 at or above the threaded portion thereof and provide fluid communication with an annular space 73 formed by the inner wall of the tubular shell 19 and a projecting flange of the plug 55; the annular space 73 being in fluid communication with the fluid motor 21. The lower end of the plug 55 is provided with a central conical cavity 75 and, in the surface of the conical cavity, there is a fluid passage 77, preferably of small diameter, which communicates with one of the branch passages 71. A sleeve 79 which surrounds and slides on the neck 57 is provided with an outer knurled grasping surface and a rectangular shaped groove 81 in the inner surface. The groove 81, as shown in FIG. 3, is substantially as wide as the distance between the upper and lower limits of the radial passages 65, 67. And so, when the sleeve 79 is in the position shown in FIG. 3, the groove 81, in effect, forms an annular space with the neck 57 forming one wall of it. The annular space or groove 81, in the position shown, provides, therefore, fluid communication between the upper radial passages 65 and the lower radial passages 67. The sleeve 79 is fluidly sealed both above and below the groove 81 by O-rings 83 which are retained in suitable circumferential grooves 85 in the sleeve 79. The adapter fitting 59 may be of any convenient form and is internally threaded at the upper end to receive the end of a threaded flexible hose 87, for a purpose to be explained hereinafter. Another length of flexible exhaust hose 89 is fitted over the end of the exhaust tube 47, for a purpose to be explained hereinafter.

Figure 6:
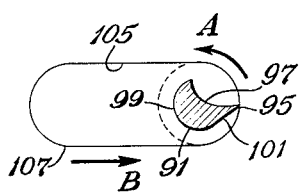
FIG. 6 is a schematic plan view (at an enlarged scale) of the kerf made by the cutter element of FIG. 1.

The rotary type of cutter 34 includes a tapered blade portion 91 which is integrally formed with a cylindrical shank portion 93. The blade portion has a uniform straight taper which in a typical cutter may be about fifteen-sixteenths of an inch per foot. A cutting edge 95 having this taper is formed by a single flute 97 which in a typical cutter may have a forward helix or rake angle of about one and one-fourth degrees. A typical blade portion 91, furthermore, may have a radial relief of about twelve-thousandths of an inch. It should be mentioned that cutter blades having various other radial reliefs, in the range of three-thousandths to thirty-five thousandths of an inch have been tried, but those having a radial relief of between ten and twelve thousandths of an inch have proved most satisfactory. As shown in FIGS. 5 and 6, the cross sectional form of the blade portion 91 comprises a back surface 99 which is generally semicylindrical; the arcuate surface of the flute 97; and an arcuate surface 101 (or a flat surface if desired) that merges with the back 99 and with the flute surface to form the blade portion cutting edge 95. The diameter of a typical blade cutting edge circle at the tip may be about sixty-thousandths of an inch and the diameter of the cutting edge circle at the root section adjacent the shank may be about one hundred nine thousandths of an inch. As mentioned hereinbefore, the flute angle in a typical blade has a forward rake or helix angle of about one and one-fourth degrees. That is to say, the axis of the flute slopes outwardly about one and one-fourth degrees, from tip to root, toward the cutting edge 95. The axis of the flute, however, may have a rake angle in the range of up to four degrees forward and up to two degrees backward rake (that is, it may slope toward the back of the blade) and still perform satisfactorily. A forward rake of about one and one-fourth degrees, however, is preferred. The cutter blade portion 91, in a preferred embodiment, has a single flute.

Figure 2:
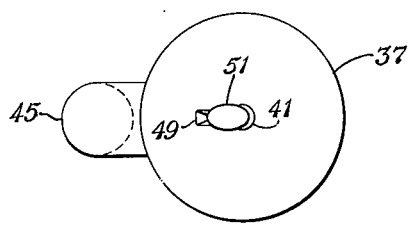
FIG. 2 is a schematic bottom end view (at an enlarged scale) of the apparatus of FIG. 1.

Now, in order to understand the manner in which the apparatus operates, reference may be made particularly to FIGS. 1 and 2. The apparatus, as shown in FIG. 1, is in one operative position; the cutter 34 has been inserted and tightened in the chuck or collet so that the bottom of the blade tip is a few thousandths of an inch above the top of the foot 51. The cutter element 34, of course, is easily fixed in the chuck or collet 29 simply by unscrewing and removing the adapter cap or dome 37; loosening the cap 32; and, after inserting the shank of the cutter element into the chuck or collet, tightening the cap 32 and then threading the adapter cap or dome 37 onto the end of the main body portion. The fluid pressure hose 87 is connected to a controllable source of suitable gas under pressure, for example, dry, compressed nitrogen. The flexible hose 89 is the exhaust hose through which the gas is conveyed to a suitable discharge place after it has passed through the fluid motor. In the position shown in FIG. 3, the speed control or sleeve 79 is in the wide-open position. The gas enters the adapter fitting 59 and traverses the axial passage 61 and the short passage 63 in the neck 57 whereupon the gas diverges and enters the annular space 81 via the upper radial passages 65. From the annular space 81, the gas reenters the neck 57, via the lower radial passages 67, and traverses the axial passage 69 to its lower end. Whereupon the gas traverses the two sloping branch passages 71 and enters the annular space 73. From the annular space 73, the gas moves directly in a longitudinal direction into the fluid motor 21 and drives the spindle and cutter blade. A small portion of the gaseous fluid, however, flows via the passage 77 into the conical cavity 75 and thence onto the upper bearing 23, to cool same.

Upon emerging from the lower end of the fluid motor 21, the gaseous fluid flows, via a plurality of longitudinal passages 103 in the lower end of the tubular shell 19, into the space surrounding the spindle 27 and thence into the exhaust tubes 45, 47 and the exhaust hose 89. It was mentioned hereinbefore that the speed control or sleeve 79, as shown in FIG. 3, is in the wide open position. It should be evident now that the speed control may be moved upward to various other positions on the neck 57 and in this manner, reduce the area of the radial passages available for fluid flow and, thus, control the speed of the motor and the cutter element. It should be noticed that when the speed control is moved upward as far as it will go, which occurs when the upper end of the speed control abuts the adapter fitting 59, the lower O-ring 83 has moved upward to a position where it covers the radial slots 67. In this position, no gaseous fluid may enter the radial and axial passages leading to the fluid motor 21 and so it will not operate. But, it is possible, of course, to readily adjust and locate the speed control 79 (actually the lower O-ring 83) in various positions whereby the motor may be made to run at various reduced speeds. In this simple and effective manner, the surgeon can vary and control the speed of the cutter element to obtain the most satisfactory results.

Before performing a brain operation, the scalp of the patient is cut and laid back, exposing an area of the skull that is to be removed with apparatus of the present invention. First, a single small hole, just large enough to admit the guide foot 51, is made in the skull in the customary manner. If desired, the hole may be drilled with the cutter element of the present invention. The guide foot 51 is inserted therein and the motor 21 started by moving the speed control 79 to a selected position or until the cutter element attains a desired speed. In trepanning, it is important that the dura mater, commonly called the dura, which lies between the brain and the inner surface of the skull, be not ruptured nor torn from the skull inner surface. And so, the guide foot 51 is so shaped that its upper surface readily follows the inner surface of the skull and its forward edge and rounded bottom carefully separate the dura from the skull with a minimum of trauma to blood vessels and without harm to the patient. As the apparatus and cutter element is advanced, the surgeon holds the guide foot 51 closely against the underside of the skull, so that the forward edge of the guide foot will pass between and separate the dura from the skull. The apparatus may be tilted slightly to form an oblique kerf, if desired, or it may be held generally perpendicular to the skull. In FIG. 6 there is shown a kerf, having parallel sides 105, 107, made by a cutter element 91 rotating in the direction of the arrow A and advancing in the direction of the arrow B.

A feature of the present invention is the high cutting efficiency of the trepanning and bone cutting apparatus. We have found that the cutting efficiency of blades constructed in accordance with the present invention is related to the blade rotational speed. We have found that blade rotational speeds within the range from about 20,000 to 45,000 r.p.m. will yield excellent cutting efficiencies. We have also found that blade rotational speeds substantially below 20,000 r.p.m. will not yield satisfactory results, due to the tendency for the blade and apparatus to chatter and also due to the tendency for the cutter blade to dig nto the skull bone rather than to cut it clearly, thus making it difficult to dexterously maneuver the apparatus and to avoid undue fatigue. It is recognized that blade rotational speeds substantially above 45,000 r.p.m. may also yield excellent cutting efficiencies, but at such very high speeds, presently available drive means have severe torque limitations.

Another feature of the present invention is the cutter element. One of the difficult problems involved in making a satisfactory trepanning apparatus is that of providing a cutter element which is sized to make a desirably small kerf and yet which is strong enough to perform reliably without breakage and which at the same time is capable of effectively handling the bone cuttings. We have found that a tapered cutter element having a single flute with a rake angle within the range from 4 degrees forward to 2 degrees backward and having a radial relief in the range of three thousandths to thirty-five thousandths of an inch provides an effective solution to this problem.

Another feature of the present invention is that the trepanning apparatus constructed in accordance therewith is capable of performing its cutting operations while significantly reducing trauma of the skull bone tissue and skull bone hemorrhaging. Experience in actual practice has shown that the bone cutting apparatus of the present invention produces a clean, smooth kerf with an insignificant amount of bleeding.

Another feature of the present invention is that there is a significant saving in time to trepan a skull and to stop bleeding. As hereinbefore stated, a typical trepanning operation utilizing prior art apparatus consumed from 30 to 45 minutes and the additional time required to stop the bleeding due to trauma and skull bone hemorrhaging was as much as 30 minutes. When utilizing trepanning apparatus in accordance with the present invention, a trepanning operation typically takes only about 15 minutes, and since the apparatus produces only insignificant trauma essentially all of the time formerly devoted to the stopping of bleeding is saved. This means that in some cases the total time required when utilizing apparatus of the present invention may be as little as one-fifth of the time that would be required using prior art apparatus. On the average, when using apparatus in accordance with the present invention a surgeon can trepan a skull in one-third to one-half the time formerly required. The significance of such time-saving will be readily appreciated since it is generally realized that in the performance of such operations, time is an important consideration.

Another feature of the present invention is the configuration of the elongate strut 49. It is desirable that the support for the guide foot 51 be such that the highest possible degree of maneuverability for the trepanning apparatus is maintained. The trapezoidal cross sectional form of the elongate strut 49 in accordance with the present invention provides requisite strength while at the same time affording a high degree of maneuverability for the apparatus.

Although especially applicable to trepanning, it is recognized that bone cutting apparatus utilizing principles of the present invention is also very useful in orthopedic and other bone cutting operations. It is also recognized that in some bone cutting operations, especially where the kerf width is not primarily important, the cutter element need not be tapered.

While we have shown our invention in only one form, it will be obvious to those skilled in the art that it is not so limited, but is susceptible of various changes and modifications without departing from the spirit thereof.

We claim:

1. In a trepanning apparatus of a type including a body portion having a longitudinal axis; drive means including a rotor journaled therein and having an output shaft; means for rotating said drive means at speeds in excess of 20,000 r.p.m.; chuck means attached to said shaft; a cutter element inserted and retained in said chuck means and comprising a shank portion and a uniformly tapering blade portion, there being in said blade portion a flute having a rake angle selected from the range of four degrees forward to two degrees backward; a strut fixed to said main body and lying in a plane containing said axis, with a guide foot fixed to the end of said strut so as to be in spaced apart relation to the end of said cutter element; that improvement which comprises: said flute forming a single cutting edge having a radial relief selected from a range of eight thousandths of an inch to sixteen thousandths of an inch, with said cutter element being driven at speeds in excess of 20,000 r.p.m.; and strut having an isosceles trapezoidal cross sectional form and disposed with the larger parallel side parallel to and spaced from said cutting edge.

2. In a trepanning apparatus of a type including a body portion having a longitudinal axis; drive means including a rotor journaled therein and having an output shaft; means for rotating said drive means at speeds in excess of 20,000 r.p.m.; chuck means attached to said shift; a cutter element inserted and retained in said chuck means and comprising a shank portion and a uniformly tapering blade portion, there being in said blade portion a flute having a rake angle selected from the range of four degrees forward to two degrees backward; a strut fixed at one end to said body portion and lying in a plane containing said axis; and a guide foot fixed to the end of said strut so as to be in spaced relation to the end of said cutter element; that improvement which comprises: said flute forming a single cutting edge having a radial relief selected from a range of three thousandths of an inch to thirty-five thousandths of an inch, with said cutter element being driven at speeds in excess of 20,000 r.p.m.

3. In a trepanning apparatus of a type including a body portion having a longitudinal axis; drive means including a rotor journaled therein and having an output shaft;

means for rotating said drive means at speeds in excess of 20,000 r.p.m.; chuck means attached to said shaft; a cutter element inserted and retained in said chuck means and comprising a shank portion and a uniformly tapering blade portion, there being in said blade portion a flute having a rake angle selected from the range of four degrees forward to two degrees backward; a strut fixed at one end to said body portion and lying in a plane containing said axis; and a guide foot fixed to the end of said strut so as to be in spaced apart relation to the end of said cutter element; that improvement which comprises: said flute forming a single cutting edge having a radial relief selected from a range of eight thousandths of an inch to sixteen thousandths of an inch with said cutter element being driven at speeds in excess of 20,000 r.p.m.

4. In a trepanning apparatus of a type including a body portion having a longitudinal axis; drive means including a rotor journaled therein and having an output shaft; means for rotating said drive means at speeds in excess of 20,000 r.p.m.; chuck means attached to said shaft; a cutter element inserted and retained in said chuck means and comprising a shank portion and a uniformly tapering blade portion, there being in said blade portion a flute having a rake angle selected from the range of four degrees forward to two degrees backward; a strut fixed to said main body portion and lying in a plane containing said axis, with a guide foot fixed to the end of said strut so as to be in spaced apart relation to the end of said cutter element; that improvement which comprises: said flute forming a single cutting edge having a radial relief selected from a range of three thousandths of an inch to thirty-five thousandths of an inch, with said cutter element being driven at speeds in excess of 20,000 r.p.m.; and said strut having an isosceles trapezoidal cross sectional form and disposed with the larger parallel side parallel to and spaced from said cutting edge.

5. In a bone cutting apparatus of a type including a body portion; drive means including a rotor journaled therein and having an output shaft; means for rotating said drive means at speeds in excess of 20,000 r.p.m.; chuck means attached to said shaft; and a cutter element inserted and retained in said chuck means and rotatable therewith, said cutter element comprising a shank portion and a blade portion, there being in said blade portion a flute having a rake angle selected from the range of four degrees forward to two degrees backward; that improvement which comprises: said flute forming a single cutting edge having a radial relief selected from a range of three thousandths of an inch to thirty-five thousandths of an inch, with said cutter element being driven at speeds in excess of 20,000 r.p.m.

6. In a bone cutting apparatus of a type including a body portion; drive means including a rotor journaled therein and having an output shaft; means for rotating said drive means at speeds in excess of 20,000 r.p.m.; chuck means attached to said shaft; and a cutter element inserted and retained in said chuck means and rotatable therewith, said cutter element comprising a shank portion, a cutter blade portion formed integrally with said shank portion, and a flute in said blade portion having a rake angle selected from the range of four degrees forward to two degrees backward, that improvement which comprises: said flute forming a single cutting edge having a radial relief selected from a range of eight thousandths of an inch to sixteen thousandths of an inch, with said cutter element being driven at speeds in excess of 20,000 r.p.m.

References Cited by the Examiner

UNITED STATES PATENTS

| | | | |
|---|---|---|---|
| 1,781,564 | 11/1930 | Beattie | 30—286 X |
| 1,923,177 | 8/1933 | Tucker. | 77—67 |
| 2,786,373 | 3/1959 | Patton | 77—67 |
| 2,937,444 | 4/1960 | Kern. | |
| 3,074,167 | 1/1963 | Truchi et al. | |

OTHER REFERENCES

"Bone and Joint Instruments" in catalog of V. Mueller and Company, page 5.

RICHARD A. GAUDET, *Primary Examiner.*

GREGORY McNEILL, *Assistant Examiner.*